US007253250B2

(12) United States Patent
Farachi et al.

(10) Patent No.: US 7,253,250 B2
(45) **Date of Patent: *Aug. 7, 2007**

(54) SIMPLIFIED METHOD OF PRODUCING BIODEGRADABLE ALIPHATIC POLYESTERS

(75) Inventors: Fernanda Farachi, San Pietro Vernotico (IT); Marco Foa', Novara (IT); Tiziana Milizia, Avellino (IT)

(73) Assignee: Ministero dell 'Universita'e della Ricerca Scientifica e Technologica, Rome (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/059,658

(22) Filed: Feb. 17, 2005

(65) Prior Publication Data

US 2005/0171327 A1 Aug. 4, 2005

Related U.S. Application Data

(62) Division of application No. 10/378,715, filed on Mar. 4, 2003, now abandoned, which is a division of application No. 09/936,598, filed as application No. PCT/EP00/02305 on Mar. 15, 2000, now Pat. No. 6,562,939.

(30) Foreign Application Priority Data

Mar. 15, 1999 (IT) .............................. TO99A0198

(51) Int. Cl.
*C08G 63/78* (2006.01)

(52) U.S. Cl. ................... 528/283; 528/295.5; 528/296; 528/300; 528/301; 528/302; 428/411.1; 428/480

(58) Field of Classification Search ............ 528/295.3, 528/295.5, 296, 300, 301, 302, 307, 283; 428/34.1, 35.7, 98, 221, 304.4, 308.8, 357, 428/411.1, 480

See application file for complete search history.

(56) References Cited

U.S. PATENT DOCUMENTS

| | | | | |
|---|---|---|---|---|
| 4,554,343 | A | | 11/1985 | Jackson, Jr. et al. |
| 4,970,288 | A | | 11/1990 | Larkin et al. |
| 5,168,310 | A | | 12/1992 | Hayashi et al. |
| 5,306,787 | A | | 4/1994 | Takiyama et al. |
| 5,473,103 | A | * | 12/1995 | Domb et al. ................ 562/509 |
| 5,741,882 | A | * | 4/1998 | Fujii et al. .................. 528/279 |
| 5,905,046 | A | * | 5/1999 | Takeda et al. ............. 442/416 |
| 6,730,724 | B1 | * | 5/2004 | Bastioli et al. ............... 524/47 |

FOREIGN PATENT DOCUMENTS

| | | | |
|---|---|---|---|
| EP | 0 565 235 A | | 10/1993 |
| EP | 0 565 235 A2 | | 10/1993 |
| EP | 0 618 249 | * | 10/1994 |
| EP | 0 747 416 | * | 12/1996 |
| JP | 63218750 A | | 9/1988 |
| WO | WO-94/14870 | | 7/1994 |

OTHER PUBLICATIONS

XP-0023139602—"Synthesis and characterization of degradable copolymers of fatty diacids adn ricinoleic acid" by Shuai et al., Database Caplus Chemical Abstract Service, Columbus, OH Feb. 2, 1998. (abstract only).

Chemical Abstract for Japanese publication No. 0046982, published Apr. 23, 1979.

Chemical Abstract for Japanese publication No. 61019628, published Jan. 28, 1986.

Chemical Abstract for Japanese publication No. 09059359, published Mar. 4, 1997.

* cited by examiner

*Primary Examiner*—Irina S. Zemel
(74) *Attorney, Agent, or Firm*—Connolly Bove Lodge & Hutz LLP

(57) ABSTRACT

A method of synthesizing biodegradable aliphatic polyesters from one or more aliphatic dicarboxylic acids or diesters of the said acids and one or more linear or branched aliphatic glycols, comprising a first esterification or transesterification step and a second deglycolation under vacuum step, in which the catalyst is monobutylstannoic acid both for the esterification or transesterification step and for the deglycolation under vacuum step.

17 Claims, 1 Drawing Sheet

SIMPLIFIED METHOD OF PRODUCING BIODEGRADABLE ALIPHATIC POLYESTERS

This application is a Divisional of application Ser. No. 10/378,715 filed Mar. 4, 2003 now abandoned, which is a Divisional of application Ser. No. 09/936,598 filed Dec. 4, 2001, now U.S. Pat. No. 6,562,939 which is a National Stage of PCT/EP00/02305 filed Mar. 15, 2000 which in turn claims priority from Italian Application TO99A000198 filed Mar. 15, 1999.

TECHNICAL FIELD

The present invention relates to a novel method of preparing biodegradable aliphatic polyesters which can be produced by polycondensation between aliphatic diols and aliphatic diacids or esters thereof.

BACKGROUND OF THE INVENTION

It is known that aliphatic polyesters represent a class of biodegradable polymers. The feasibility of using them to produce products, however, is linked to the achievement of high molecular weights which enable the products to have suitable qualities such as, for example, adequate mechanical strength, which render them fit for use.

In the literature, various methods of achieving this objective have been tried.

In U.S. Pat. No. 5,306,787 and in European patent application EP-0 565 235, the use of diisocyanates as chain extenders on the fused polymer is described. In patent application EP 0 747 416 the use of triisocyanates alongside diisocyanates is also reported.

The use of these chain extenders makes the polymerization process more complex since it requires two distinct steps: the actual polymerization step, and the upgrading step to produce high molecular weights. In these cases, the polymerization process is also dangerous to health and capable of unfavourably modifying the biodegradability of the materials and giving rise to potentially toxic substances during the biodegradation processes.

According to U.S. Pat. No. 5,741,882, the production of saturated polyesters of high molecular weight from diesters and glycols is linked basically with the particular way in which the catalytic system is added, and with the presence of a scavenger of free radicals. The catalyst, which is constituted by alcoholates or acetyl acetonates of various transition metals, preferably of titanium since they are indicated as being most active, is added at at least two moments in the course of the polymerization step, preferably at the beginning and during the deglycolation.

In addition to the complex and ill-defined way of adding the catalyst, the method claimed suffers from some important limitations such as the need to start with eaters of the saturated acids, and the fact that at least 30% of the esters are succinates and that at least 70% of the glycols comprise 1,4-butandiol.

Limitations in structure are also present in the method described in the patent WO94/14870. The dicarboxylic acid used is in fact succinic acid or a mixture thereof with another aliphatic diacid. The method also provides for a particularly complex catalytic system comprising a catalyst for the first stage of the polymerization and a catalyst for the second stage. In fact, during the esterification or transesterification step, the use of tetrabutyl titanate, alone or also mixed with calcium or zinc acetates, tetrapropyl titanate, or dibutyl tin oxide, is provided for. During the deglycolation stage, dibutyl tin oxide is, used, alone or mixed with butyl, iso-propyl, or n-propyl titanates or calcium acetate.

Moreover, the polymerization in solvent described in patent application. EP-0 618 249 appears not to be easy to implement in practice owing to the need to use and to dehydrate large quantities of high-boiling solvents such as diphenyl ether. There is a further difficulty when the solubility of the polymer is such as to require large quantities of precipitating solvent for the isolation.

With regard to the use of catalysts in the polyester preparation process, various classes of inorganic or organometallic tin compounds, used mainly for the production of aromatic polyesters in the polyesterification or transesterification step, have been described (U.S. Pat. No. 4,970,288, U.S. Pat. No. 5,166,310). In no case, however, is the use of these compounds described for the preparation of biodegradable aliphatic polyesters.

Moreover, amongst organometallic tin compounds, butylstannoic acid is not described as having a greater activity for the production of biodegradable aliphatic polyesters than the other tin derivatives.

DESCRIPTION OF THE INVENTION

The subject of the present invention is a method of synthesizing biodegradable aliphatic polyesters from one or more aliphatic dicarboxylic acids (or from diesters of the said aliphatic dicarboxylic acids) and one or more linear or branched aliphatic glycols, comprising an esterification or transesterification step and a deglycolation under vacuum step, characterized in that the catalyst, is monobutylstannoic acid and that the catalyst is the sole catalyst both for the esterification or transesterification step, and for the deglycolation under vacuum step.

DESCRIPTION OF BEST AND VARIOUS MODES

Figure 1:
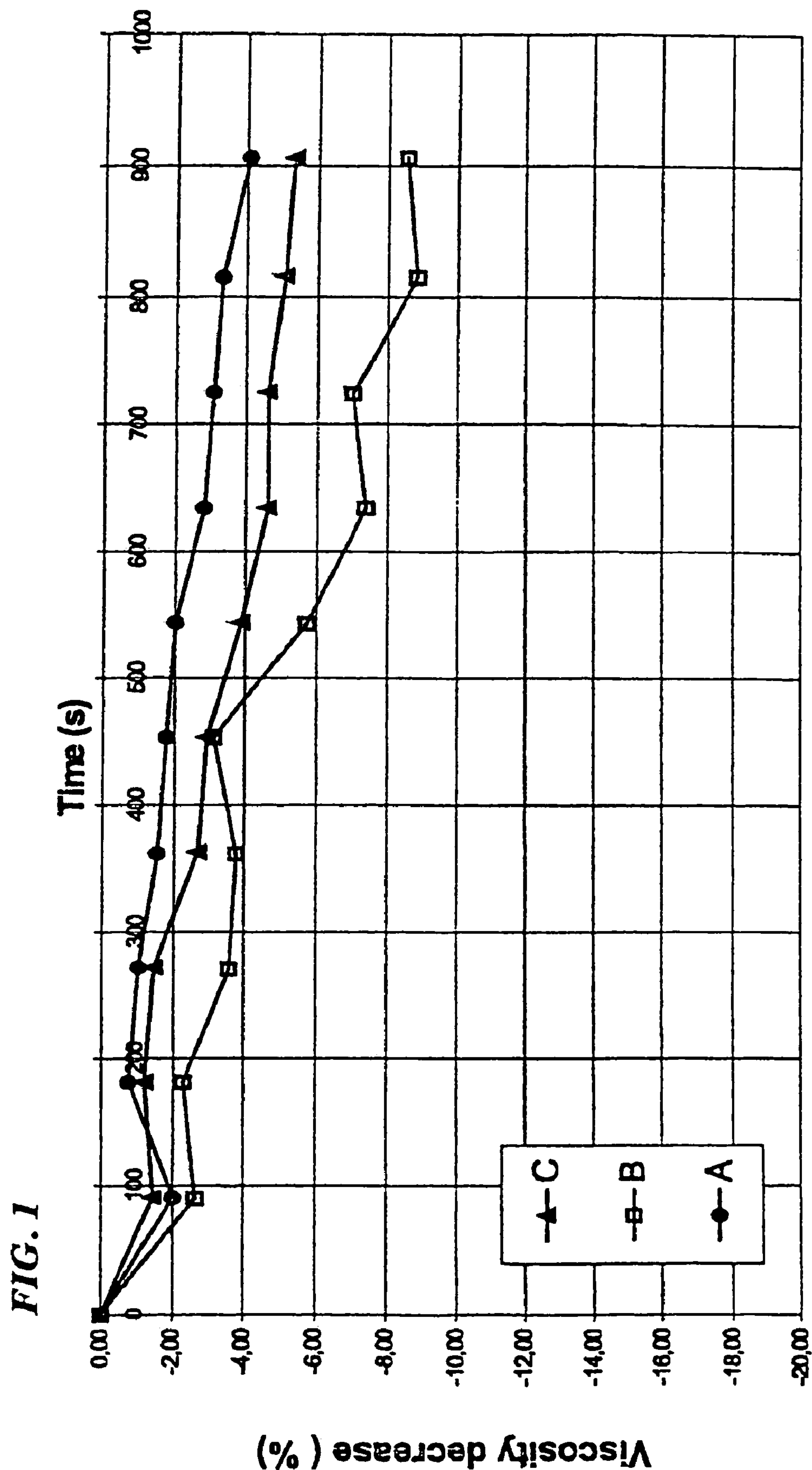
FIG. 1 is a graph of viscosity decrease v. time.

In particular, according to the novel method, it is possible to prepare biodegradable saturated polyesters, suitably adjusting their molecular weights according to the practical applications concerned (films, injection-moulding products, extrusion coatings, fibres, etc.), by virtue of the use of a catalyst which is effective both in the esterification or transesterification step and in the deglycolation step.

The method according to the invention thus provides for a suitable range of molecular weights and overcomes the disadvantages described in the prior art.

Biodegradable polyesters made according to the method of the invention display a good thermal stability (which allows them a good processability) and a good biodegradability.

Examples of dicarboxylic acids used in the method of producing saturated aliphatic polyesters according to the invention are oxalic, malonic, succinic, glutaric, adipic, pimelic, suberic, azelaic, sebacic, undecandioic, dodecandioic, brassilic acids and dimer acids.

Examples of diols are 1,2-ethandiol, 1,4-butandiol, 1,6-hexandiol, 1,7-heptandiol, 1,8-octandiol, 1,9-nonandiol, 1,10-decandiol, 1,12-dodecandiol, 1,4-cyclohexandimethanol, 1,4-cyclohexandiol, neopentyl glycol, polyoxyalkylenes and anhydrous and di-anhydrous sorbitol.

The diol is loaded into the reaction system, preferably in quantities of from 1 to 1.5 moles per mole of diacid or diester.

The method according to the invention has been found particularly effective in the synthesis of poly(alkylene sebacates).

The synthesis of the polyester in the method according to the invention is carried out in two steps, that is:

1) the esterification or transesterification step which is preferably carried out at temperatures of between 180° C. and 230° C. and in a stream of nitrogen until distillation of the by-products (water and monovalent alcohol) is complete;

2) the deglycolation step which is preferably carried out in a dynamic vacuum at a pressure of <1 mmHg and at temperatures of between 220° C. and 250° C., for a period of between 3 and 10 h.

The monobutylstannoic acid catalyst may be added at any moment during the process before the beginning of the deglycolation step and, preferably, at the beginning of the polymerization process.

The catalyst is preferably added in quantities of between $0.5\text{-}10^{-4}$ and $5\text{-}10^{-3}$ moles of catalyst/mole of dicarboxylic acid.

The method according to the invention can advantageously also be used for the synthesis of copolymers of the above-mentioned polyesters, in particular, containing up to 10% in moles of aliphatic hydroxy-acids.

Examples of these hydroxy-acids are glycolic, hydroxybutyric, hydroxycaproic, hydroxyvaleric, 7-hydroxyheptanoic, 8-hydroxyoctanoic, 9-hydroxynonanoic, lactic, ricinoleic, and 9,10-dihydroxystearic acids.

The method according to the invention is also suitable for the synthesis of branched aliphatic polyesters which are produced by introducing trifunctional or polyfunctional comonomers into the reaction system in quantities of between 0.1 and 5% in moles, relative to the dicarboxylic acid.

Examples of these comonomers are glycerol, pentaerithritol, trimethylolpropane and citric acid.

The polyesters produced by the method according to the invention have intrinsic viscosities (measured with an Ubbelhode viscometer for solutions in $CHCl_3$ with a concentration of 0.2 g/dl at 25° C.) of between 0.8 and 1.5 dl/g and preferably between 0.9 and 1.3 dl/g and MFRs, measured according to the ASTM D1238, (150° C./2.16Kg) standard, of between 0.1 g/10 min and 70 g/10 min, and preferably between 2 g/10 min and 30 g/10 min. These values render the polyesters produced by the method according to the invention particularly suitable for many practical applications.

EXAMPLES

Some examples of the method according to the invention are now given, purely by way of non-exhaustive indication.

Example 1

A 25 l steel reactor with a mechanical stirrer, an inlet for the stream of nitrogen, a condenser, and a connection to a vacuum pump was loaded with 5050 g of sebacic acid, 2362.5 g of butandiol, and 4 g ($1.9\text{-}10^{-2}$ moles, corresponding to $7.6\times10^{-4}$ moles cat./moles sebacic acid) of monobutylstannoic acid catalyst.

The temperature was gradually increased to 190° C. with vigorous stirring and under a stream of nitrogen. The reaction was continued until distillation of the water had been completed (900 ml), over a period of 210 min.

The vacuum system was then switched on, producing a vacuum of 0.5 torrs, and the temperature was brought to 230° C. over a period of 30 min.

The reaction was continued for 210 min at the temperature given above and at the pressure of 0.5 torrs. The resulting polyester has then been discharged from the reactor by means of a die forming strands which have been cooled in a water bath at 15° C. for, at least; 5 seconds. The polyester has then been granulated and dried to a water, content less than 0.2% by weight. With the process has been produced 6 kg of polybutylene sebacate with an inherent viscosity of 0.9 dl/g and a MFR of 40 g/10 min.

Comparative Example 1 bis

The method described in Example 1 was repeated to produce the polybutylene sebacate polyester in the same experimental conditions but with the use of dibutyl tin oxide in a quantity of 4.5 g ($1.9\text{-}10^{-2}$ mol) as the sole catalyst.

The polymer produced had an inherent viscosity of 0.58 dl/g, that is, a much lower viscosity value which rendered it unsuitable for any significant practical application.

Example 2

6877 g of sebacic acid and 3217 g of butandiol were loaded into the reactor of Example 1. The temperature was gradually increased to 200° C. with vigorous stirring and under a stream of nitrogen. The reaction was continued until distillation of the water had been completed (1226 ml), over a period of 180 min.

4.0 g of monobutylstannoic acid catalyst (corresponding to $5.6\times10^{-4}$ moles cat/moles sebacic acid) was then added to the reactor and, the vacuum system was switched on, producing a vacuum of 0.5 torrs, and the temperature was brought to 240° C., over a period of 50 min. The reaction was continued for 300 min and the resulting polymer has been then subjected to the discharge, cooling and drying procedure described in Example 1.

The polymer produced had an inherent viscosity of 1.32 dl/g and a MFR of 4 g/10 min.

Example 3

5056 g of sebacic acid, 3028 g of hexandiol, and 4 g of monobutylstannoic acid catalyst were loaded into the reactor of Example 1.

The temperature was gradually increased to 205° C. with vigorous stirring and under a stream of nitrogen. The reaction was continued until distillation of the water had been completed (900 ml), over a period of 180 min.

The vacuum system was then switched on, producing a vacuum of 0.5 torrs, and the temperature was brought to 240° C. over a period of 40 min. The reaction was continued for 300 min and the resulting polymer has been then subjected to the discharge, cooling and drying procedure described in Example 1.

The polymer produced had an inherent viscosity of 1.3 dl/g and a MFR of 3 g/10 min.

Example 4

6464 g of sebacic acid, 2182 g of 1-2-ethandiol and 6 g of monobutylstannoic acid catalyst were loaded into the reactor of Example 1.

The temperature was gradually increased to 190° C. with vigorous stirring and under a stream of nitrogen. The reaction was continued until distillation of the water had been completed (1150 ml), over a period of 300 min.

The vacuum system was then switched on, producing a vacuum of 0.5 torrs, and the temperature was brought to 240° C. over a period of 30 min. The reaction was continued for 420 min and the resulting polymer has been then subjected to the discharge, cooling and drying procedure described in Example 1.

The polymer produced had an inherent viscosity of 1.24 dl/g and a MFR of 5 g/10 min.

Example 5

A 1.5 l, cylindrical, Pyrex glass reactor with a mechanical stirrer, an inlet for the stream of nitrogen, a condenser, and a connection to a vacuum pump was loaded with 118 g of succinic acid, 121 g of hexandiol and 0.26 g of monobutylstannoic acid catalyst.

The temperature was gradually increased to 210° C. with vigorous stirring and under a stream of nitrogen. The reaction was continued until distillation of the water had been completed (36 ml), over a period of 150 min.

The vacuum system was then switched on, producing a vacuum of 0.5 torrs, and the temperature was brought to 230° C. over a period of 30 min. The reaction was continued for 300 min at the temperature given above and at the pressure of 0.5 torrs, producing 200 g of polyhexamethylene succinate with an inherent viscosity of 0.8 dl/g and a MFR of 60 g/10 min.

Example 6

202 g of sebacic acid, 109 g of hexandiol, 10.4 g of neopentyl glycol, and 0.26 g of monobutylstannoic acid were loaded into the reactor described in Example 5.

The temperature was gradually increased to 180° C. with vigorous stirring and under a stream of nitrogen. The reaction was continued until distillation of the water had been completed (36 ml), over a period of 240 min.

The vacuum system was then switched on, producing a vacuum of 0.5 torrs, and the temperature was brought to 240° C. The reaction was continued for 300 min at the temperature given above and at the pressure of 0.5 torrs. The polymer produced had an inherent viscosity of 1.06 dl/g and a MFR of 12 g/10 min.

Example 7

101 g of sebacic acid, 89.2 g of decandiol, and 0.13 g of monobutylstannoic acid were loaded into the reactor described in Example 5.

The temperature was gradually increased to 190° C. with vigorous stirring and under a stream of nitrogen. The reaction was continued until distillation of the water had been completed (18 ml), over a period of 210 min.

The vacuum system was then switched on, producing a vacuum of 0.5 torrs, and the temperature was brought to 240° C. The reaction was continued for 240 min at the temperature given above and at the pressure of 0.5 torrs. The polymer produced had an inherent viscosity of 1.2 dl/g and a MFR of 5 g/10 min.

Tests on the thermal stability have been carried out on the polyester in order to evaluate its stability with respect to temperature and time.

In order to obtain data on the thermal stability of a polymeric material it is possible to measure, by a rheometer, the viscosity of the melt at constant temperature and shear rate since the viscosity of the melt is related to the molecular weight distribution of the polymer.

When the viscosity increases this means a regradation or cross-linking phenomena, whereas when the viscosity decreases it means that a degradation occurs.

With regard to the measurement of the thermal stability it has to be noted that:

- the temperature has been selected in relation to the standard conditions for the polymer processing since the polymer has to result stable during the manufacturing of the final products;
- residence time of the polymer in the barrel of the rheometer has been selected with regard to the maximum residence time (at the selected temperature) of the polymer in a processing device (such as an extruder and so on);
- the shear rate has been selected with reference to a value corresponding to the "linear behaviour zone" of the polymer that is to say the zone of the curve stress/shear rate where a doubling of the shear corresponds to a doubling of the stress.

Tests have been performed on 3 samples:

- sample A: polyester made according to example 2;
- sample B: polyester made according to example 2 but with a $11.3\times10^{-4}$ ratio of moles cat/moles sebacic acid and a MFR of 12 g/10 min;
- sample C: polyester made according to example 2 but with a $11.3\times10^{-4}$ ratio of moles cat/moles sebacic acid and a MFR of 4 g/10 min.

The tests have been performed on a capillary rheometer GOTTFERT RHEO-TESTER 1000 which detect the viscosity of the melt. The temperature of the chamber was 160° C.

The polymer has been fed to the barrel and preheated for a time of 650 s (pre heating time) and then has been pushed in the capillary so to have a shear rate of 100 $s^{-1}$.

Viscosity values of the melt have been detected from the end of the preheating time over a period of 900 s (that is to say a time higher than the usual residence time of the polymer in a processing device).

The viscosity decrease has been expressed as:

$$\eta i - \eta o / \eta o \times 100$$

where $\eta o$=viscosity at the end of the pre-heating time $\eta i$=viscosity after i sec from the end of the pre-heating time where $0<i<900$ s The data are reported in FIG. 1. They show that after 900 sec the viscosity decrease is less than 10%.

Texts have been performed also with reference to the biodegradability of the polymers made with the process according to the invention.

Polymers produced according to example 2 (polybutylene sebacate), example 3 (polyexamethylene sebacate) and example 7 (polydecamethylene sebacate) have been subjected to the Control Composting Test according to the ISO DIS 14855.

The polymers have shown a biodegradability higher than 60% in 180 days with the polybutylene sebacate showing a biodegradability higher than 90% in the same period of time.

Polyesters produced according to the process of the invention are suitable for a lot of applications wherein a good processability and/or a good biodegradability of the polymer are requested such as :

- coatings produced by extrusion-coating,
- multi-layer laminates with layers of paper, plastics-material or paper/plastics material, aluminium and metallized films,
- films as such and multi-layer films with other polymer materials,
- sacks and bags for organic waste and for grass cuttings with periods of use longer than 1 week,
- single-layer and multi-layer food packaging comprising containers for milk, yoghurt, cheeses, meat and beverages, in which the layer in contact with the food or beverage is formed by the aliphatic polyester,
- composites with gelatinized or destructured starch, and/or complexed starch or natural starch as a filler,
- mono-directional and bi-directional films, shrink films, stretch films,
- semi-expanded and expanded products produced by physical and/or chemical means, by extrusion, injection, or agglomeration of pre-expanded particles,
- expanded sheet and expanded containers for foods, for drugs, and for fast food,
- fibres, fabrics and non-woven fabrics in the hygiene, sanitary and clothing fields,
- composites with mineral and vegetable fillers,
- thermoformed sheets for the food or fast-food packaging fields,
- bottles for the food, cosmetics and pharmaceutical fields,
- fishing nets,
- containers for fruit and vegetables,
- extruded sections usable in the fast-food field and irrigation pipes in the agricultural field.

The invention claimed is:

1. Copolymer of biodegradable aliphatic polyester from one or more aliphatic dicarboxylic acids or diesters of the said acids and one or more linear or branched aliphatic glycols, and from ricinoleic acid and wherein said copolymer has an intrinsic viscosity of between 0.8 and 1.5 dl/g.

2. Copolymer according to claim 1, characterized by containing a maximum of 10% in moles of ricinoleic acid.

3. Copolymer according to claim 1, characterized in that said dicarboxylic acids are selected from the group consisting of oxalic acid, malonic acid, succinic acid, glutaric acid, adipic acid, pimelic acid, suberic acid, azelaic acid, sebacic acid, undecandioic acid, dodecandioc acid, brassylic acid, and dimmer acid.

4. Copolymer according to claim 1, characterzed in that said glycols are selected from the group consisting of 1,2-ethandiol, 1,4-butandiol, 1,6-hexandiol, 1,7-heptandiol, 1,8-octandiol, 1,9-nonandiol, 1,10-decandiol, 1,12-dodecandiol, 1,4-cyclohexandimethanol, 1,4-cyclohexandiol, neopentyl, glycol, polyoxyalkylenes, anhydrous and dianhydrous sorbitol.

5. Copolymer according to claim 1, characterized in that said aliphatic polyester comprises a branched aliphatic polyester produced by introducing trifunctional or polyfunctional comonomers into the reaction system in quantities of between 0.1 and 5% in moles, relative to the dicarboxylic acid.

6. Copolymer according to claim 5, characterized in that said trifunctional polyfunctional comonomers are selected from the group consisting of glycerol, pentaerithritol, trimethylolpropane and citric acid.

7. Copolymer according to claim 1, having an intrinsic viscosity of between 0.9 and 1.3 dl/g.

8. Copolymer according to claim 1, with MFR of between 0.1 and 70 g/10 min.

9. Copolymer according to claim 8, with MFR of between 2 and 30 g/10 min.

10. Copolymer according to claim 1, wherein the thermal stability measured as viscosity decrease is less than 10%.

11. Copolymers according to claim 1, wherein the biodegradability is higher than 60% in 180 days.

12. Copolymer according to claim 11, wherein the biodegradability is higher than 90% in 180 days.

13. Copolymer according to claim 2, characterized in that said dicaraboxylic acids are selected from the group consisting of oxalic acid, malonic acid, succinic acid, glutaric acid, adipic acid, pimelic acid, suberic acid, azelaic acid, sebacic acid, undecandioic acid, dodecandioc acid, brassylic acid, and dimmer acid.

14. Copolymer according to claim 2, characterzed in that said glycols are selected from the group consisting of 1,2-ethandiol, 1,4-butandiol, 1,6-hexandiol, 1,7-heptandiol, 1,8-octandiol, 1,9-nonandiol, 1,10-decandiol, 1,12-dodecandiol, 1,4-cyclohexandimethanol, 1,4-cyclohexandiol, neopentyl, glycol, polyoxyalkylenes, anhydrous and dianhydrous sorbitol.

15. Copolymer according to claim 2, characterized in that said aliphatic polyester comprises a branched aliphatic polyester produced by introducing trifunctional or polyfunctional comonomers into the reaction system in quantitites of between 0.1 and 5% in moles, relative to the dicarboxylic.

16. An article selected from the group consisting of:

- Coatings produced by extrusion coating;
- Multi-layers laminates with layers of paper, plastic material or paper/plastic material, aluminum and metallized films;
- Films;
- Sacks for organic refuse and for grass cuttings with period of use longer than one week;
- Single-layer and multi-layer food packaging comprising container for milk, yogurt, cheese, meat and beverages, in which the layer in contact with said food or beverage is formed by an aliphatic polyester;
- Composites with gelatinized or destructured starch, and/or complexed starch or natural starch as a filler;
- Mono-directional and bi-directional films, shrink films, stretch films;
- Semi-expanded and expanded products produced by physical and/or chemical means, by extrusion, injection or agglomeration of pre-expanded particles;
- Expanded sheets and expanded containers for food, for drugs and for fast food;
- Fibres, fabrics and non-woven fabrics in the hygiene, sanitary and clothing fields;
- Composites with mineral and vegetable fillers;
- Thermoformed sheets for food or fast-food packaging;
- Bottles for the food, cosmetic and pharmaceuticals fields;
- Fishing nets;
- Containers for fruit and vegetables; and
- Extruded sections usable in the fast-food field and irrigation pipes in the agricultural fields; which comprises a copolymer according to claim 1.

17. A multilayer film wherein at least one of the layers comprises a copolymer according to claim 1 and at least one othr layer comprises a polymer material other than said copolymer.

* * * * *